(12) United States Patent
Mabu et al.

(10) Patent No.: US 10,615,673 B2
(45) Date of Patent: Apr. 7, 2020

(54) APPARATUS AND METHOD FOR INJECTING RESIN INTO LAMINATED IRON CORE

(71) Applicant: MITSUI HIGH-TEC, INC., Kitakyushu-shi, Fukuoka (JP)

(72) Inventors: Hirotoshi Mabu, Fukuoka (JP); Satoshi Matsubayashi, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 320 days.

(21) Appl. No.: 15/669,214

(22) Filed: Aug. 4, 2017

(65) Prior Publication Data

US 2018/0048220 A1 Feb. 15, 2018

(30) Foreign Application Priority Data

Aug. 10, 2016 (JP) .................. 2016-157744

(51) Int. Cl.
*H02K 15/12* (2006.01)
*H02K 1/27* (2006.01)
(Continued)

(52) U.S. Cl.
CPC ............. *H02K 15/12* (2013.01); *B29C 45/03* (2013.01); *B29C 45/14065* (2013.01);
(Continued)

(58) Field of Classification Search
CPC ...... H02K 15/12; H02K 15/03; H02K 15/024; H02K 1/27; H02K 1/16; H02K 15/02;
(Continued)

(56) References Cited

U.S. PATENT DOCUMENTS

2003/0151327 A1 8/2003 Ramirez
2008/0276446 A1 11/2008 Amano et al.
(Continued)

FOREIGN PATENT DOCUMENTS

CN 101356711 A 1/2009
CN 103812282 A 5/2014
(Continued)

OTHER PUBLICATIONS

China Official Action recited in 201710683126.7 dated Jan. 2, 2020.

*Primary Examiner* — Nahida Sultana
(74) *Attorney, Agent, or Firm* — Greenblum & Bernstein, P.L.C.

(57) ABSTRACT

An apparatus includes a mold unit and a receive unit which clamp a laminated iron core body from both sides in a lamination direction, the laminated iron core body including a plurality of laminated iron core pieces and a resin hole pierced in the lamination direction, a plunger which extrudes a resin of an inside of a resin pool part formed in the mold unit, and a cull plate arranged between the laminated iron core body and the mold unit. The cull plate includes a close contact part with the resin on a side opposed to the plunger, the close contact part including a projection projected to a side of the plunger beyond a groove bottom of a runner formed in the cull plate, or a recess recessed to a side of the laminated iron core body beyond the groove bottom of the runner.

12 Claims, 9 Drawing Sheets

(51) Int. Cl.
*B29C 45/03* (2006.01)
*B29C 45/14* (2006.01)
*H02K 15/03* (2006.01)
*B29C 45/27* (2006.01)
*H02K 1/16* (2006.01)
*H02K 15/02* (2006.01)
*B29C 45/02* (2006.01)
*B29K 705/12* (2006.01)
*B29L 31/00* (2006.01)

(52) U.S. Cl.
CPC ........ *B29C 45/14344* (2013.01); *B29C 45/27* (2013.01); *H02K 1/16* (2013.01); *H02K 1/27* (2013.01); *H02K 15/024* (2013.01); *H02K 15/03* (2013.01); *B29C 45/02* (2013.01); *B29K 2705/12* (2013.01); *B29L 2031/7498* (2013.01)

(58) Field of Classification Search
CPC .............. B29C 45/27; B29C 45/14344; B29C 45/14065; B29C 45/03; B29C 45/02; B29L 2031/7498; B29K 2705/12
See application file for complete search history.

(56) References Cited

U.S. PATENT DOCUMENTS

| | | |
|---|---|---|
| 2010/0083486 A1 | 4/2010 | Amano et al. |
| 2011/0179633 A1 | 7/2011 | Amano et al. |
| 2014/0117590 A1* | 5/2014 | Dame ................... B29C 70/443 264/511 |
| 2014/0124978 A1 | 5/2014 | Mabu |
| 2015/0217485 A1* | 8/2015 | Aufray ................. B29C 70/443 264/40.1 |
| 2015/0372571 A1* | 12/2015 | Hashimoto ............ H02K 15/03 156/264 |

FOREIGN PATENT DOCUMENTS

| | | |
|---|---|---|
| CN | 103812284 A | 5/2014 |
| JP | 2002-34187 | 1/2002 |
| JP | 2003-529309 | 9/2003 |
| JP | 2007-325368 A | 12/2007 |
| JP | 2014-36486 A | 2/2014 |
| JP | 2014-96932 A | 5/2014 |

* cited by examiner

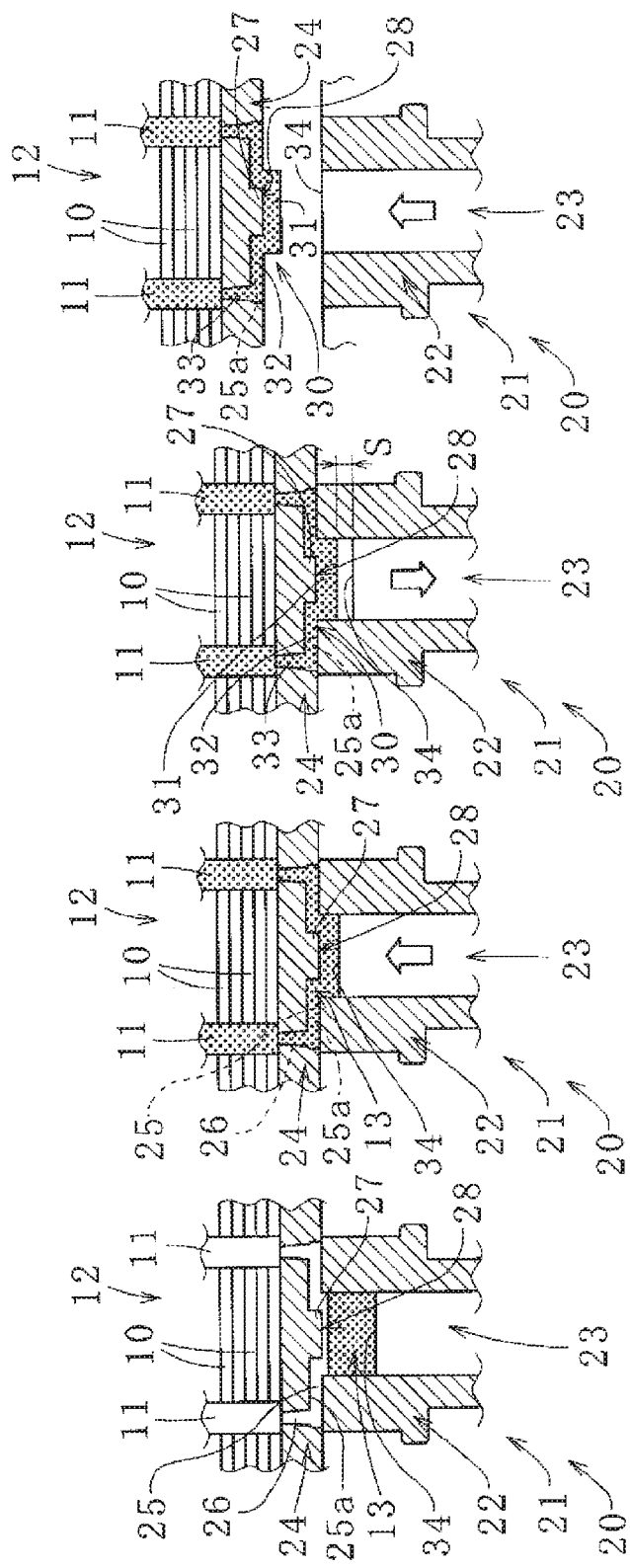

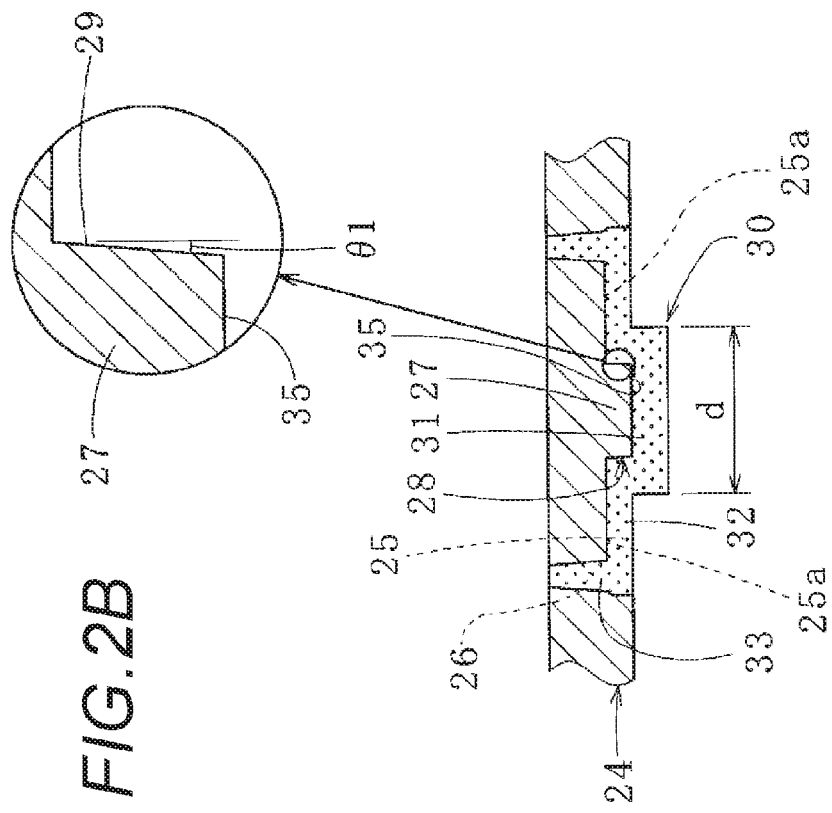
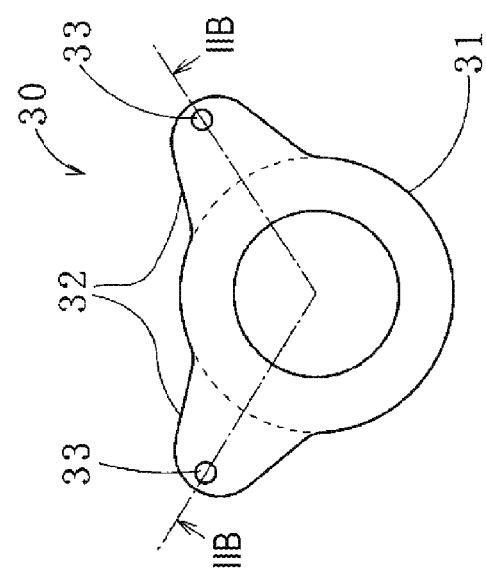
FIG.2A
FIG.2B

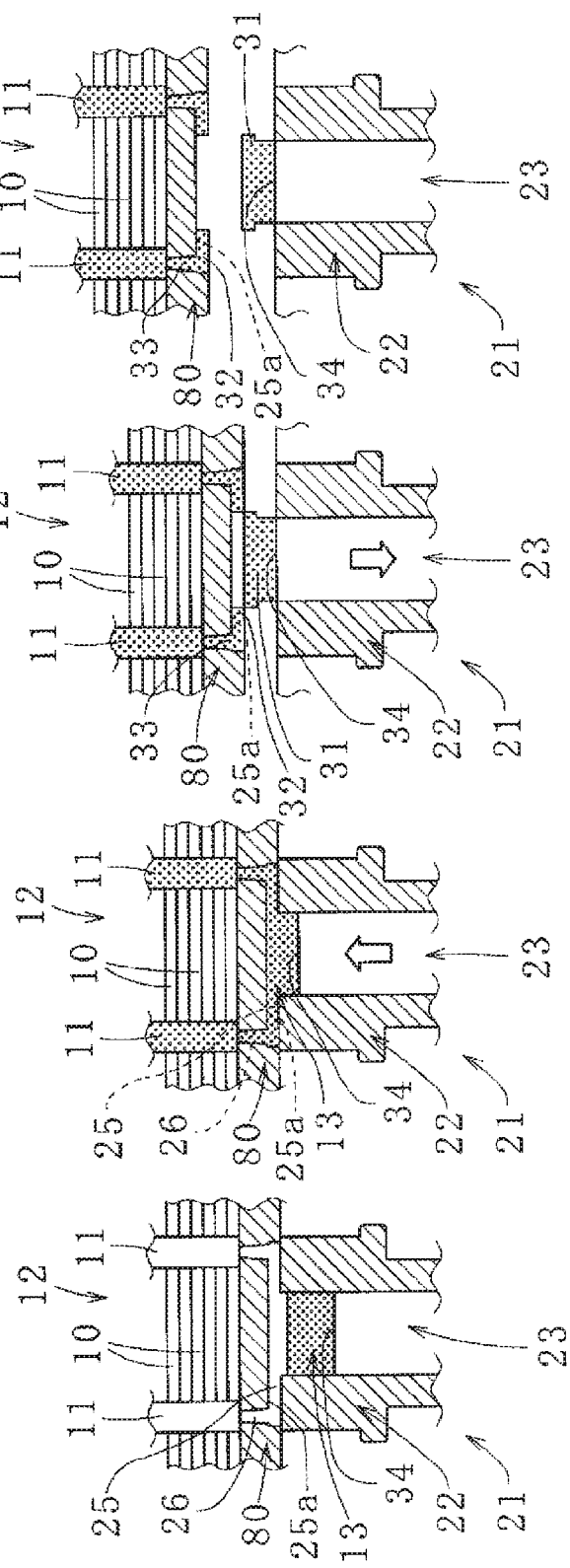

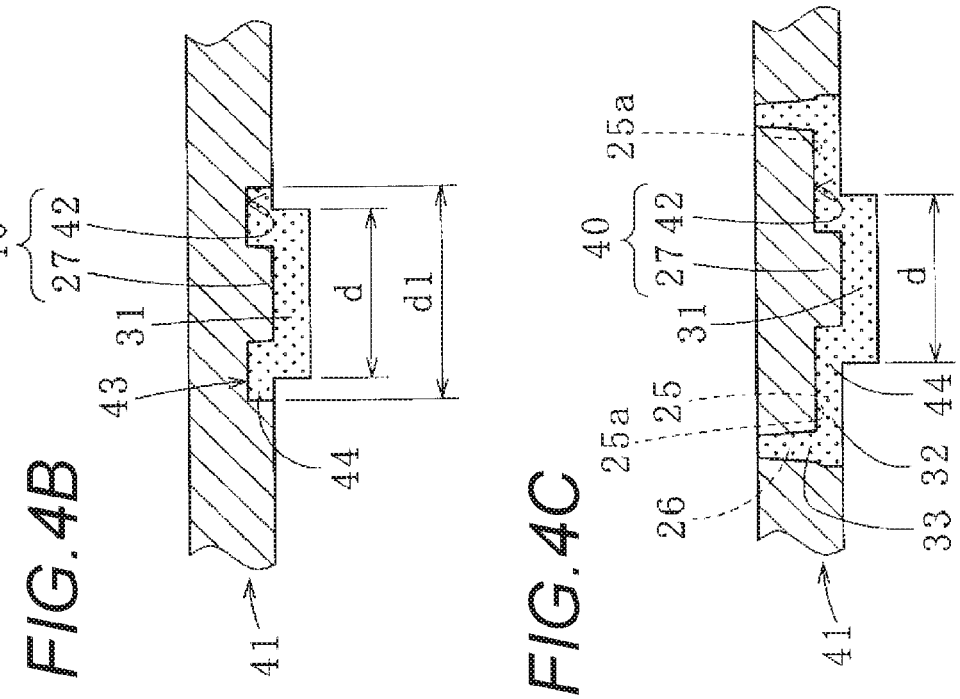
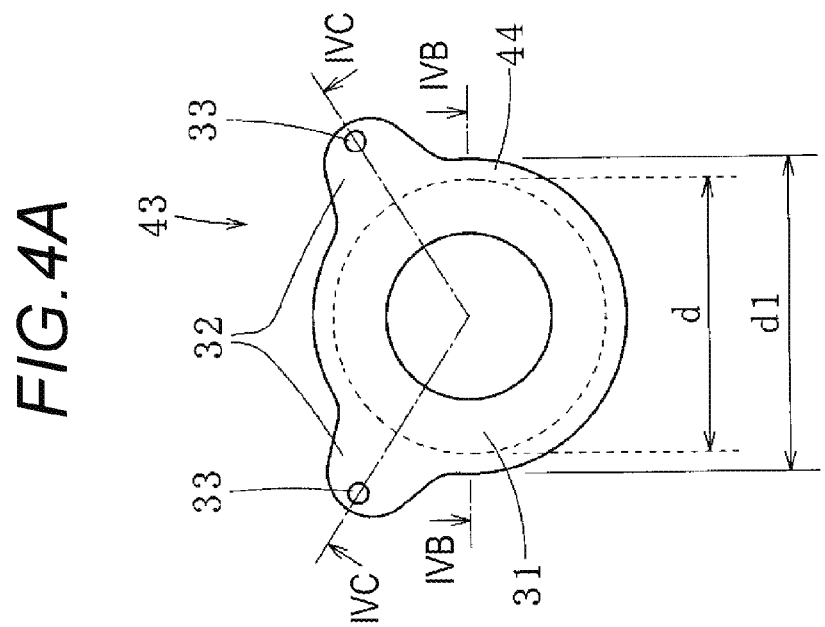

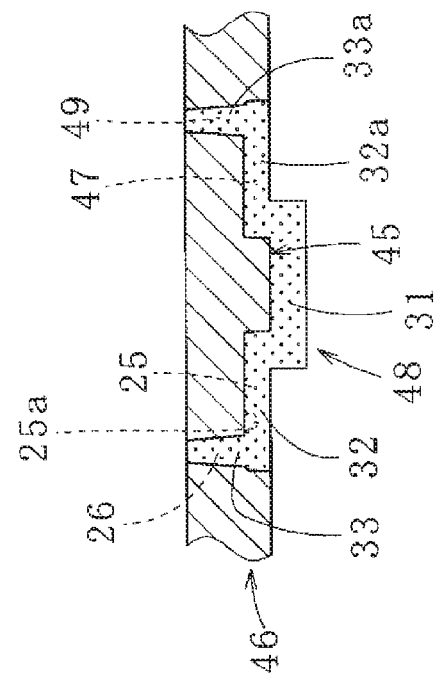
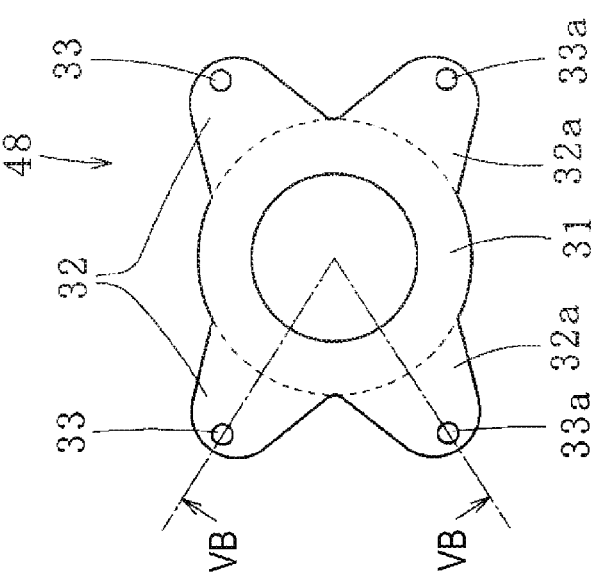

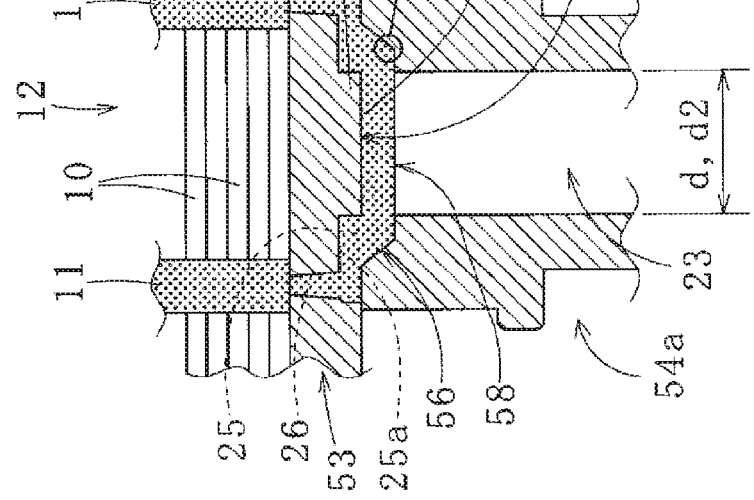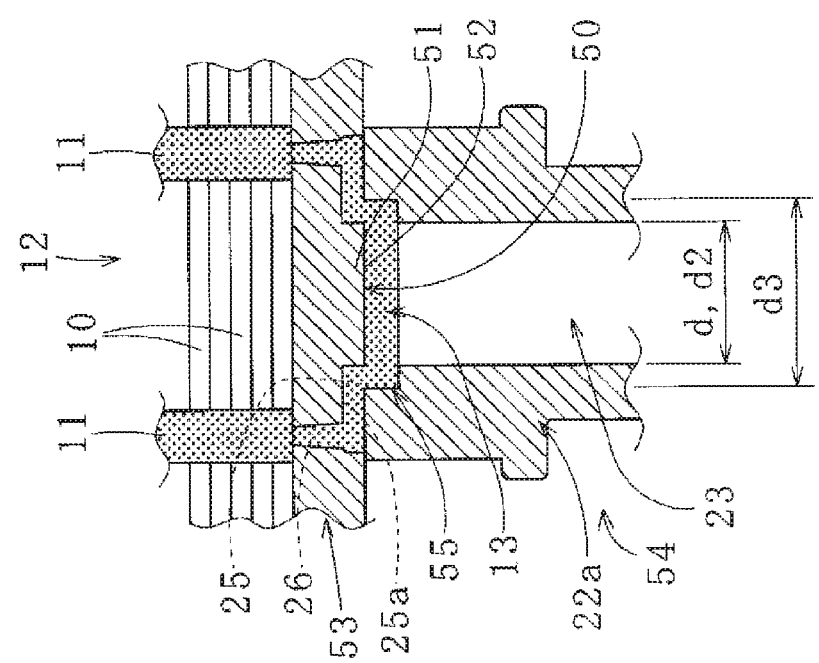

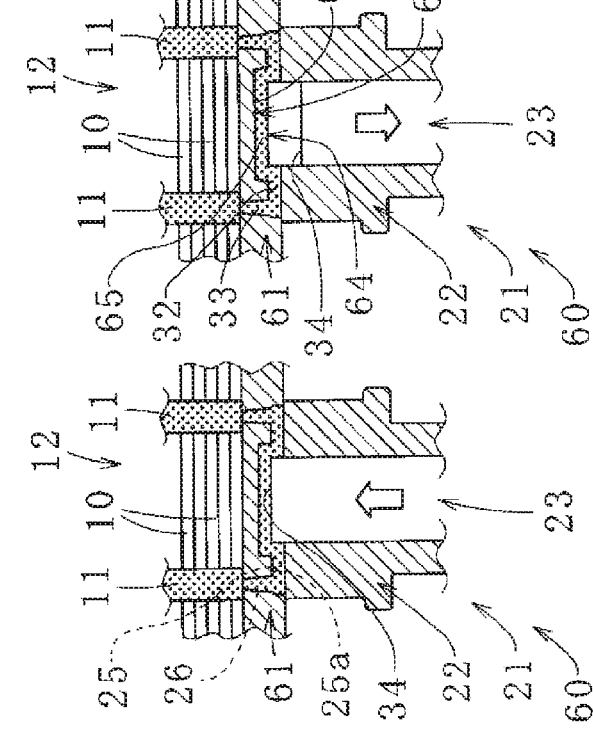

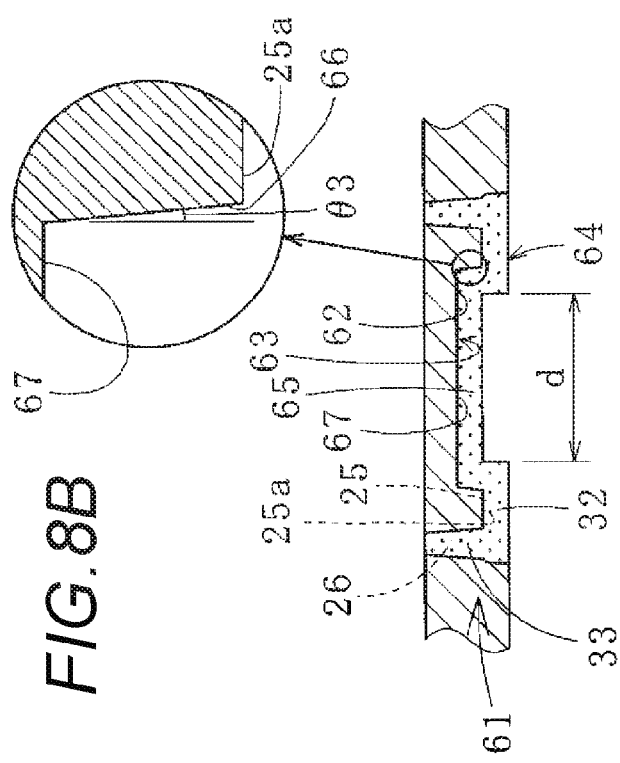
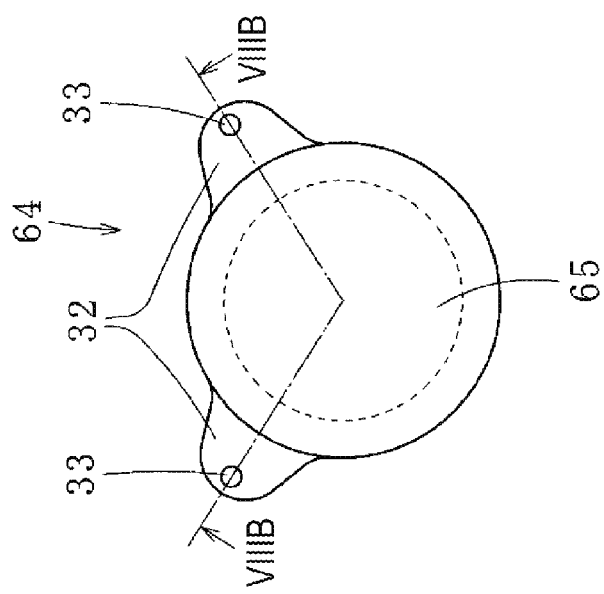
FIG.8A
FIG.8B

APPARATUS AND METHOD FOR INJECTING RESIN INTO LAMINATED IRON CORE

CROSS REFERENCE TO RELATED APPLICATION

This application is based upon and claims the benefit of priority of Japanese Patent Application No. 2016-157744 filed on Aug. 10, 2016, the contents of which are incorporated herein by reference in its entirety.

BACKGROUND OF THE INVENTION

1. Field of the Invention

The present invention relates to an apparatus for injecting a resin into a laminated iron core constructed by laminating a plurality of iron core pieces, and a method for injecting the resin into the laminated iron core.

2. Description of the Related Art

A laminated iron core constructed by laminating plurality of iron core pieces includes a stator iron core (or stator) or a rotor iron core (or rotor) formed with a resin hole pierced in a lamination direction.

The rotor iron core is formed with a hole part made of a resin hole pierced in an axial direction as described in, for example, JP-A-2002-34187 as Patent Literature 1, and a permanent magnet fitted into the hole part is fixed by using a resin with which the inside of the hole part is filled. Also, the stator iron core is formed with an axial housing made of a resin hole along a height direction as described in, for example, JP-T-2003-529309 as Patent Literature 2, and a plurality of stacked thin metal sheets are fixed by curing a resin injected into the axial housing.

Patent Literature 1: JP-A-2002-34187
Patent Literature 2: JP-T-2003-529309

SUMMARY OF THE INVENTION

An unwanted resin sticking out of the resin hole in the cured resin is respectively adhered to the side of the laminated iron core and a mold unit for injecting the resin, and becomes resistant to remove the unwanted resin. As a result, cracks (fractures) tend to occur in the portion with the weakest strength in the resin sticking out of the resin hole when the laminated iron core is detached from the mold unit.

Consequently, there is a problem of requiring work of respectively removing the unwanted resin separated by the cracks from the mold unit and the laminated iron core.

The present invention has been implemented in view of such circumstances, and a non-limited object of the present invention is to provide an apparatus for injecting a resin into a laminated iron core, capable of manufacturing the laminated iron core and improving workability of work of removing an unwanted resin without producing cracks in the resin, and a method for injecting the resin into the laminated iron core.

There is provided, according to a first aspect of the present invention, an apparatus for injecting a resin into a laminated iron core, the apparatus including:

a mold unit which includes a resin pool part;
a receive unit paired with the mold unit and clamping a laminated iron core body from both sides in a lamination direction between the receive unit and the mold unit, wherein the laminated iron core body includes a plurality of laminated iron core pieces and a resin hole pierced in the lamination direction inside the laminated iron core body;

a plunger which extrudes a resin of an inside of the resin pool part formed in the mold unit; and a cull plate arranged between the laminated iron core body and the mold unit, and including a runner through which the extruded resin is injected to the resin hole of the laminated iron core body, wherein the cull plate includes a close contact part with the resin on a side opposed to the plunger, the close contact part including a projection projected to a side of the plunger beyond a groove bottom of the runner formed in the cull plate, or a recess recessed to a side of the laminated iron core body beyond the groove bottom of the runner formed in the cull plate.

There is provided, according to a second aspect of the present invention, a method for injecting a resin into a laminated iron core, the method including:

arranging and clamping a laminated iron core body between a receive unit and a mold unit with a cull plate provided between the laminated iron body and the mold unit, wherein the laminated iron core body includes a plurality of laminated iron core pieces and a resin hole pierced in the lamination direction inside the laminated iron core body;

with the laminated iron core body being clamped, extruding a resin of an inside of a resin pool part formed in the mold unit using a plunger and injecting the resin into the resin hole through the cull plate, wherein the cull plate includes a close contact part with the resin on a side opposed to the plunger, the close contact part including a projection projected to a side of the plunger beyond a groove bottom of a runner formed in the cull plate, or a recess recessed to a side of the laminated iron core body beyond the groove bottom of the runner formed in the cull plate;

after curing the resin in the resin hole, separating unwanted resin from the plunger by moving the plunger by a given distance in a direction away from the laminated iron core body before the cull plate together with the unwanted resin is detached from the mold unit; and after separating the unwanted resin from the plunger, moving the plunger to the side of the laminated iron core body.

In the apparatus and the method for injecting the resin into the laminated iron core according to the aspects of the present invention, the side opposed to the plunger in the cull plate includes the close contact part with the resin, the close contact part including the projection projected to the side of the plunger beyond the groove bottom of the runner formed in the cull plate, or the recess recessed to the side of the laminated iron core body beyond the groove bottom of the runner, with the result that the area (surface area) of contact with the resin can be increased and properties of close contact between the cull plate and the resin can be improved.

Accordingly, cracks in the unwanted resin can be decreased and further prevented, and workability of work of removing the unwanted resin can be improved and also, the use amount of the resin can be reduced.

BRIEF DESCRIPTION OF THE DRAWINGS

In the accompanying drawings:
FIGS. 1A to 1D are explanatory diagrams of a method for injecting a resin using an apparatus for injecting the resin into a laminated iron core according to a first embodiment of the present invention;

FIG. 2A is a plan view of an unwanted resin formed in the apparatus for injecting the resin into the laminated iron core, and FIG. 2B is a partially enlarged view and a sectional view taken on arrow IIB-IIB of FIG. 2A in a cull plate;

FIGS. 3A to 3D are explanatory diagrams of a method for injecting a resin using an apparatus for injecting the resin into a laminated iron core according to a reference example;

FIG. 4A is a plan view of an unwanted resin formed in the apparatus for injecting the resin into the laminated iron core according to a first modified example, and FIG. 4B is a sectional view taken on arrow IVB-IVB of FIG. 4A in a cull plate, and FIG. 4C is a sectional view taken on arrow IVC-IVC of FIG. 4A in the cull plate;

FIG. 5A is a plan view of an unwanted resin formed in the apparatus for injecting the resin into the laminated iron core according to a second modified example, and FIG. 5B is a sectional view taken on arrow VB-VB of FIG. 5A in a cull plate;

FIGS. 6A and 6B are explanatory diagrams of the method for injecting the resin using the apparatus for injecting the resin into the laminated iron core according to third and fourth modified examples, respectively;

FIGS. 7A to 7D are explanatory diagrams of a method for injecting a resin using an apparatus for injecting the resin into a laminated iron core according to a second embodiment of the present invention;

FIG. 8A is a plan view of an unwanted resin formed in the apparatus for injecting the resin into the laminated iron core, and FIG. 8B is a partially enlarged view and a sectional view taken on arrow VIIIB-VIIIB of FIG. 8A in a cull plate.

DETAILED DESCRIPTION OF THE EXEMPLARY EMBODIMENTS

Figure 9A:
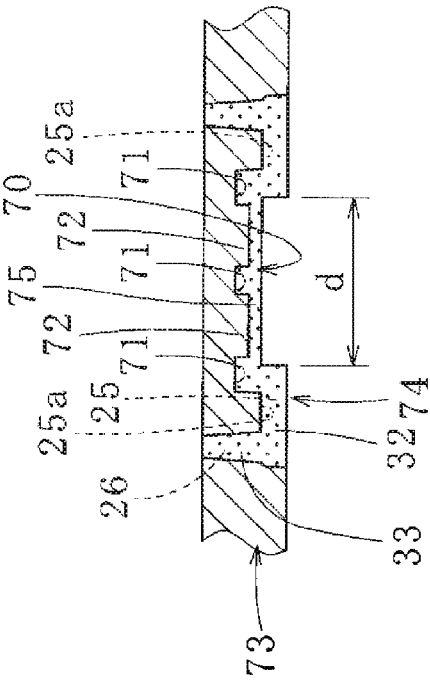
FIG. 9A is a plan view of an unwanted resin formed in the apparatus for injecting the resin into the laminated iron core according to a fifth modified example.

Subsequently, an embodiment of the present invention will be described with reference to the accompanying drawings, and the present invention will be understood.

First, a laminated iron core to which an apparatus for injecting a resin into the laminated iron core according to first and second embodiments of the present invention is applied will be described, and then, the apparatus for injecting the resin into the laminated iron core and a method for injecting the resin into the laminated iron core will be described.

As shown in FIGS. 1A to 1D and 7A to 7D, a laminated iron core has a laminated iron core body 12 constructed by laminating a plurality of annular iron core pieces 10 and inwardly formed with a resin hole 11 pierced in a lamination direction.

The iron core piece 10 is blanked and formed from a strip workpiece (thin metal sheet) made of, for example, an amorphous material or an electromagnetic steel plate with a thickness of about 0.10 to 0.5 mm. In addition, the iron core piece 10 may be a piece blanked from one strip workpiece, or a piece blanked from a plurality (for example, two, or three or more) of stacked strip workpieces.

The iron core piece 10 has an annular integral structure, but may have a divided structure capable of annularly joining a plurality of circularly arcuate iron core piece parts, or a structure capable of connecting a part of the plurality of circularly arcuate iron core piece parts in a circumferential direction by a joining part and folding the joining part to be formed in an annular shape.

Also, the laminated iron core body may be formed by sequentially rotating and laminating a plurality of block iron cores formed by respectively laminating a plurality of annular iron core pieces. In addition, all of the plurality of block iron cores have the same shape, but, for example, a part of the block iron cores may have a different shape.

A rotor iron core which is one example of the laminated iron core has a laminated iron core body (that is, the laminated iron core body 12), and the iron core pieces (that is, the iron core pieces 10) adjacent in the lamination direction of the laminated iron core are mutually coupled using, for example, caulking, an adhesive or welding. In addition, the inside of this laminated iron core body is formed with a coupling hole (that is, the resin hole 11) pierced in the lamination direction, and this coupling hole is filled with a resin 13 and thereby, the iron core pieces adjacent in the lamination direction can also be mutually coupled. Also, in this coupling, any two or more of caulking, an adhesive, welding and a resin can be combined.

In addition, a laminated iron core constructed without using the coupling (that is, in a loose state) may be used. In this case, iron core pieces are placed on cull plates 24, 61 described below and are positioned, and the loose iron core pieces are integrated.

The center of the rotor iron core is formed with a shaft hole, and a plurality of magnet-insert holes (that is, the resin holes 11), for permanent magnets, pierced in the lamination direction are formed circumferentially around the shaft hole. The permanent magnet inserted into each of the magnet-insert holes is fixed by curing the resin 13 with which each of the magnet-insert holes is filled.

In addition, as the resin 13 with which the coupling hole or the magnet-insert hole described above is filled, a thermosetting resin (for example, an epoxy resin) or a thermoplastic resin can be used (the same applies hereinafter).

A stator iron core which is one example of the laminated iron core has a laminated iron core body (that is, the laminated iron core body 12), and the iron core pieces (that is, the iron core pieces 10) adjacent in the lamination direction of the laminated iron core are mutually coupled by filling a coupling hole (that is, the resin hole 11) pierced in the lamination direction with the resin 13. In this coupling, any one or two or more of caulking, an adhesive and welding can be further combined.

In addition, the plurality of coupling holes described above are formed in a circumferential direction of the stator iron core.

Also, the stator iron core is formed with a plurality of slots (magnetic pole parts) in the circumferential direction of the stator iron core.

Next, the apparatus (hereinafter simply also called a resin injecting apparatus) for injecting the resin into the laminated iron core according to the first embodiment of the present invention will be described with reference to FIGS. 1A to 1D and FIGS. 2A and 2B.

The apparatus for injecting the resin into the laminated iron core has a mold device 20. The mold device 20 includes an upper mold (not shown) (one example of a receive unit) used as a pressing mold, and a lower mold (one example of a mold unit) 21 used as a resin injecting mold, the upper and lower molds pinching the laminated iron core body 12 from both sides in the lamination direction. The lower mold 21 is provided with a resin pool pot (one example of a resin pool part) 22, and the inside of this resin pool pot 22 is provided with a plunger 23 upwardly and downwardly movable by a driving source (for example, a cylinder or a jack).

In the case of use of the resin injecting apparatus, the laminated iron core body 12 is arranged on the lower mold 21 through the cull plate 24 (the cull plate 24 is arranged between the laminated iron core body 12 and the lower mold 21), and the upper mold is arranged on the laminated iron core body 12 (the laminated iron core body 12 is arranged between the lower mold 21 and the upper mold), and the laminated iron core body 12 is clamped (closed with the molds).

Then, with the laminated iron core body 12 clamped, the liquid resin 13 of the inside of the resin pool pot 22 is extruded by upwardly moving the plunger 23, and the resin 13 is injected into the resin hole 11 through the cull plate 24 and is cured.

This cull plate 24 is a jig (also called a conveyance tray or a core set plate) made of a metal (a stainless plate or a steel plate) capable of placing and conveying the laminated iron core body 12, and is respectively formed with a runner (a resin flow path) 25 opened toward a lower surface side, and a gate hole (a resin injection hole) 26 communicated to the runner 25 and opened toward an upper surface side.

Since this gate hole 26 is formed in a position overlapping with the resin hole 11 in plan view, the resin 13 of the inside of the runner 25 can respectively be injected into the resin hole 11 through the gate hole 26.

The side of the cull plate 24 opposed to the plunger 23 includes a close contact part 28 with the resin 13, the close contact part 28 including a projection 27 projected to the side of the plunger 23 beyond a position of a groove bottom 25a of the runner 25 formed in the cull plate 24.

As shown in FIG. 2B, the projection 27 has a circular truncated conical shape, and an outside diameter (an outside width) of the projection 27 is gradually decreased (decreased) toward the side of the plunger 23. An inclination angle θ1 of an outer peripheral surface (one example of a peripheral side surface) 29 of this projection 27 is not particularly limited, but is preferably set at values from 3° to 18° (both inclusive) (preferably, a lower limit is 5° and an upper limit is 15°) with respect to the shaft center of the laminated iron core body 12.

When the resin 13 is injected into the resin hole 11 of the laminated iron core body 12 through the runner 25 and the gate hole 26 of the cull plate 24 as described above, an unwanted resin 30 left and cured inside the resin pool pot 22, the runner 25 and the gate hole 26 of the cull plate 24 is formed as shown in FIGS. 2A and 2B. This unwanted resin 30 is the resin excluding the resin injected into the resin hole 11 in the resin 13, and is formed, that is, by integrating a resin part 31 of the inside of the resin pool pot 22, a resin part 32 of the inside of the runner 25 and a resin part 33 of the inside of the gate hole 26 of the cull plate 24. After the unwanted resin 30 is recovered in a state adhering to the cull plate 24, the unwanted resin 30 is removed from the cull plate 24. In addition, the removed unwanted resin 30 may be, for example, discarded, or crushed and recycled.

Here, a method for injecting a resin using an apparatus for injecting a resin into a laminated iron core according to a reference example will be described with reference to FIGS. 3A to 3D.

In the reference example, after a resin 13 is injected into a resin hole 11 of a laminated iron core body 12 and is cured (FIGS. 3A and 3B), a plunger 23 is further upwardly moved and is projected from an upper surface (a resin pool pot 22) of a lower mold 21 and also, a cull plate 80 is separated from the lower mold 21 and then, the plunger 23 is downwardly moved to the inside of the lower mold 21 (FIG. 3C).

Accordingly, the laminated iron core body 12 together with the cull plate 80 can be detached from the lower mold 21 (FIG. 3D).

However, since mirror processing (lapping) is performed on a surface 34 (here, an upper surface) of contact between the plunger 23 and the resin 13, the strength of close contact between the cured resin 13 and the contact surface 34 becomes high and also, a resin part 33 cured inside a gate hole 26 of the cull plate 80 is adhered to an inner surface of the gate hole 26 and becomes resistant to removing the resin. The cull plate 80 has a shape different from that of the cull plate 24 described above, and a position of a flat (plane) part of the side opposed to the plunger 23 is flush with a position of a groove bottom 25a of a runner 25 formed in the cull plate 80 (the close contact part 28 including the projection 27 is not formed).

As a result, when the plunger 23 is downwardly moved after the cull plate 80 is separated from the lower mold 21, cracks (fractures) tend to occur in a resin part 32, with the weakest strength, left inside the runner 25 of the cull plate 80 in the cured resin 13.

Accordingly, as shown in FIG. 3C, while a resin part 31 in close contact with the contact surface 34 of the plunger 23 in the cured resin 13 is downwardly moved together with the plunger 23, the resin part 33 of the inside of the gate hole 26 adheres to the cull plate 80 together with most of the resin part 32 located inside the runner 25.

When the resin part 31 is left on the contact surface 34 of the plunger 23 in this manner, for example, work of injecting the resin 13 in manufacturing equipment of the laminated iron core is stopped and a worker must remove the resin 13 from the plunger 23, with the result that there are problems of decreasing workability and productivity of the laminated iron core.

Hence, as described above, the embodiment of the present invention provides the cull plate 24 with the close contact part 28 including the projection 27 and increases a surface area capable of making close contact with the resin 13 to thereby improve properties of adhesion of the resin part 31 to the cull plate 24.

Accordingly, the resin part 31 can be separated from the plunger 23 since the resin part 31 maintains a state adhering to the projection 27 when the cull plate 24 is detached from the lower mold 21.

In addition, after the cull plate 24 is detached from the lower mold 21, it is necessary to remove the unwanted resin 30 from the cull plate 24.

That is, since the cull plate 24 needs to have both properties of close contact with the unwanted resin 30 and mold release properties, the inclination angle θ1 of the outer peripheral surface 29 of the projection 27 is preferably set in the range described above.

For example, as a method for more improving properties of adhesion of the resin part 31 to the projection 27, polishing processing could be performed on a surface (a lower surface) 35 opposed to the plunger 23 in the projection 27.

In order to improve the adhesion properties, machine processing has been performed conventionally, but the resin has been stuck on the center of a region in which the machine processing has been performed with a lapse of a period of use. The case of performing the polishing processing on the projection 27 makes sticking of the resin smaller than the case of performing this machine processing. Also, since the projection 27 tends to be worn by contact with the resin 13 in the case of injecting the resin 13, the polishing processing can also obtain an effect of increasing the life of the cull plate by hindering the progress of wear.

On the other hand, as a method for improving properties of mold release of the resin part 31 from the projection 27, satin processing could be performed on the outer peripheral surface 29 of the projection 27.

When the satin processing is performed on the outer peripheral surface 29 of the projection 27, surface roughness Rz of the outer peripheral surface 29 is preferably set in values from 3 μm to 15 μm (both inclusive) (more preferably, a lower limit is 9 μm and an upper limit is 11 μm). Accordingly, the properties of mold release of the resin part 31 from the projection 27 can be made higher than the case where the satin processing is not performed on the outer peripheral surface 29, or the case where the surface roughness Rz of the outer peripheral surface 29 is set in less than 3 μm or more than 15 μm.

In addition, the surface roughness Rz (ten-point average roughness) described above is defined in JIS B0601 (1994), and concretely means that only a reference length is extracted from a roughness curve in a direction of its average line and the sum of average values of absolute values of elevations (Tp) from the highest top to the fifth highest top and average values of absolute values of elevations (Yv) from the lowest bottom to the fifth lowest bottom measured in a direction of longitudinal magnification from the average line of this extracted portion is obtained and this value is expressed in micrometer (μm).

The satin processing described above can be performed on the outer peripheral surface 29 of the projection 27 by performing machine processing after heat treatment. However, as long as the surface roughness Rz of the outer peripheral surface can be set in the above numerical range (range from 3 μm to 15 μm), the satin processing is not limited to the machine processing after heat treatment, and other processing methods, for example, electric discharge machining, blasting or etching can also be used.

Accordingly, since it is unnecessary to apply a mold release agent etc. to the outer peripheral surface 29 of the projection 27, ingredients (impurities) of the mold release agent etc. can be prevented from being mixed in the resin.

Also, the projection 27 is received inside the resin pool pot 22 in plan view (that is, a maximum outside diameter (an outside diameter of an upper end position) of the projection 27 is smaller than an inside diameter (an inside width) d (see FIG. 2B) of the resin pool pot 22). In this case, a height position of the surface 35 opposed to the plunger 23 in the projection 27 is set in the same height position as a lower surface (a surface of contact with the lower mold 21) of the cull plate 24.

In addition, a shape of the close contact part is not limited to this and, for example, the height or the outside diameter of the projection can be changed variously, and can also be formed in shapes shown in FIGS. 4A to 6B. Since this configuration described in FIGS. 4A to 6B is substantially similar to that of FIGS. 1A to 1D and 2A and 2B, the same numerals are assigned to the same members.

In a close contact part 40 shown in FIGS. 4A to 4C, the side of a cull plate 41 opposed to the plunger 23 further includes a first circular widened part 42 having an inside diameter (an inside width) d1 larger than the inside diameter (an outside diameter (outside width) of the plunger 23) d of the resin pool pot 22. As a result, the runner 25 is communicated to the first widened part 42.

Accordingly, an outer peripheral part of a resin part 31 of a formed unwanted resin 43 is formed with a resin part 44 pinched between the cull plate 41 and the lower mold 21, with the result that the resin part 31 can be prevented from being pulled into the resin pool pot 22 with movement of the plunger 23 in the case of downwardly moving the plunger 23.

Consequently, the inside diameter d1 of the first widened part 42 is not particularly limited as long as the inside diameter d1 is larger than the inside diameter d of the resin pool pot 22, but the inside diameter d1 is preferably values from 1.02 times to 1.15 times (both inclusive) the inside diameter d of the resin pool pot 22 in consideration of, for example, the used amount (economic efficiency) of the resin 13 or the effects described above.

In addition, the first widened part 42 is formed over the whole periphery of the projection 27, but the plurality of first widened parts 42 can also be formed partially in a circumferential direction. In this case, the plurality of first widened parts 42 are preferably formed at equal pitches in the circumferential direction in consideration of a balance of the center of gravity of the formed unwanted resin. Also in this case, it is unnecessary to communicate the runner 25 to the first widened parts 42.

In a close contact part 45 shown in FIGS. 5A and 5B, the side of a cull plate 46 opposed to the plunger 23 includes a dummy runner 47 communicated to the resin hole 11. Since this dummy runner 47 improves a balance of the center of gravity of a formed unwanted resin 48, the dummy runner 47 does not have a function of injecting the resin 13 into the resin hole 11.

Consequently, the dummy runner 47 could be formed in a position of mirror plane symmetry with respect to the runner 25, and a length, a position, the number of dummy runners, etc. are not particularly limited as long as the balance of the center of gravity of the formed unwanted resin can be improved. Also, a dummy gate hole 49 communicated to the dummy runner 47 is formed herein, but it is unnecessary to form the dummy gate hole 49 (the same applies to the first widened part described above). In addition, numerals 32a, 33a in FIGS. 5A and 5B are resin parts formed inside the dummy runner 47 and the dummy gate hole 49.

A close contact part 50 shown in FIGS. 6A and 6B includes a projection 51 projected to the side of the plunger 23 beyond a position of a groove bottom 25a of a runner 25 formed in a cull plate 53, and the projection 51 overlaps with the plunger 23 in plan view (that is, an outside diameter d2 of the projection 51 matches with an outside diameter d of the plunger 23). Also, a height position of a surface 52 opposed to the plunger 23 in the projection 51 is the same height position as a lower surface of the cull plate 53.

As a result, as shown in FIG. 6A, the side (here, the outlet side of a resin pool pot 22a) of a lower mold 54 opposed to the cull plate 53 includes a second widened part 55 having an inside diameter (an inside width) d3 larger than the outside diameter d of the plunger 23. Accordingly, a surface area capable of making close contact with the resin 13 can be increased without inhibiting the flow of the resin 13 from the resin pool pot 22a to the resin hole 11.

As shown in a second widened part 56 shown in FIG. 6B, an inside diameter (an inside width) of the second widened part 56 can also be gradually increased (increased) toward the side of the cull plate 53. An inclination angle θ2 of an inner peripheral surface 57 of this second widened part 56 is not particularly limited, but is preferably set at values from 3° to 18° (both inclusive) (preferably, a lower limit is 5° and an upper limit is 15°) with respect to the shaft center of the laminated iron core body 12.

Accordingly, properties of mold release of an unwanted resin 58 from a lower mold 54a can be improved and further, the satin processing described above can be performed on the inner peripheral surface 57 of the second widened part 56.

Subsequently, a method for injecting the resin into the laminated iron core according to the first embodiment of the present invention will be described with reference to FIGS. 1A to 1D and FIGS. 2A and 2B.

First, the plurality of iron core pieces 10 blanked from a strip workpiece using a die unit (not shown) are sequentially laminated to manufacture the laminated iron core body 12.

Here, when the laminated iron core is a rotor iron core, any one or two or more of the caulking, the welding and the resin described above can be used in coupling of the plurality of laminated iron core pieces (iron core pieces 10), but it is unnecessary to use the coupling. In addition, when the resin is used in the coupling, the coupling hole (resin hole 11) is formed in the lamination direction of the laminated iron core body (laminated iron core body 12).

Then, a non-magnetized permanent magnet (a magnetized permanent magnet may be used) is inserted into each of the magnet-insert holes (resin holes 11) of the laminated iron core body.

Also, when the laminated iron core is a stator iron core, the resin described above is used in coupling of the plurality of laminated iron core pieces (iron core pieces 10), with the result that the coupling hole (resin hole 11) is formed in the lamination direction of the laminated iron core body (laminated iron core body 12) as described above. In addition, any one or two or more of the caulking, the adhesive and the welding as well as the resin described above can be further combined in the coupling.

The laminated iron core body 12 described above is set in the mold device 20 and is clamped (FIG. 1A).

Then, with the laminated iron core body 12 clamped, the liquid resin 13 of the inside of the resin pool pot 22 is extruded by upwardly moving the plunger 23, and the resin 13 is injected into the resin hole 11 through the runner 25 and the gate hole 26 of the cull plate 24 and is cured (FIG. 1B).

The granular (solid) resin 13 previously introduced into the resin pool pot 22 is dissolved in the resin pool pot 22 to thereby obtain the liquid resin 13. As a result, by providing the cull plate 24 with the projection 27, the thickness of the resin 13 (resin part 31) of the inside of the resin pool pot 22 can be thinned (the gap between the cull plate 24 and the plunger 23 can be narrowed). Accordingly, it becomes easy to dissolve the resin 13, and properties of filling of the resin hole 11 with the liquid resin 13 can be improved.

In addition, the laminated iron core body 12 and the cull plate 24 described above are previously heated (preheated) to a resin injection temperature (for example, about 150 to 170° C.) according to a kind of used resin etc. This heating method is not particularly limited and, for example, gas (hot air) or a heater can be used.

Accordingly, fluidity of the resin 13 flowing through the laminated iron core body 12 and the cull plate 24 can be maintained to stably inject the resin 13.

Also, the laminated iron core body 12 described above may be preheated to a temperature (for example, 60 to 100° C.) lower than that of the cull plate 24. Accordingly, preheating time of the laminated iron core body 12 can be shortened to improve productivity.

Further, the upper mold and the lower mold 21 can be respectively provided with heaters (heating means) for heating the laminated iron core body 12 pinched.

When the cull plate 24 attempts to be detached from the lower mold 21 after the resin 13 injected into the resin hole 11 is cured as described above, cracks (fractures) tend to occur in the resin part 32 (with the weakest strength) of the inside of the runner 25 of the cull plate 24 in the unwanted resin 30, with the result that the unwanted resin 30 is left with the resin part 31 adhering to the surface 34 of contact between the plunger 23 and the resin 13 (see FIG. 3C).

However, the plunger 23 can be separated from the cured resin 13 (the resin part 31) by using the cull plate 24 provided with the close contact part 28 including the projection 27.

At this time, the plunger 23 is separated from the cured resin 13 (the resin part 31) by moving the plunger 23 in a downward direction (a direction away from the laminated iron core body 12) before the laminated iron core body 12 together with the cull plate 24 is detached from the lower mold 21 after the resin 13 injected into the resin hole 11 is cured (FIG. 1C: that is, a step A). Accordingly, an effect of decreasing and further preventing the cracks (fractures) in the unwanted resin 30 becomes more remarkable.

Here, in order to facilitate separation of the plunger 23 from the resin part 31, the satin processing described above is preferably performed on the surface 34 of contact between the plunger 23 and the resin part 31.

In addition, a distance of downward movement of the plunger 23 in the case of downwardly moving the plunger 23 is not particularly limited as long as the plunger 23 can be separated from the resin part 31 (more than 0 mm), but a gap S between the resin part 31 and the contact surface 34 is preferably set at 1 mm or less (preferably 0.7 mm or less, more preferably 0.5 mm or less).

This is because when the lower mold 21 and the upper mold are used and the resin 13 is injected into the resin hole 11 and is cured, the inside of the resin pool pot 22 (the gap between the unwanted resin 30 and the contact surface 34) becomes a vacuum and with movement of the plunger 23, the resin part 31 is pulled into the resin pool pot 22 and the cracks may occur in the unwanted resin 30.

After the plunger 23 is separated from the resin part 31, the plunger 23 is upwardly moved (is moved to the side of the laminated iron core body 12: that is, a step B), and is projected from the inside of the resin pool pot 22 and also, the upper mold, the laminated iron core body 12 and the cull plate 24 are upwardly moved to a specific position and thereby, the cull plate 24 is separated from the lower mold 21. At this time, movements of the upper mold, the laminated iron core body 12 and the plunger 23 synchronize.

Thereafter, the upper mold is detached from the laminated iron core body 12 and also, the plunger 23 is downwardly moved to the inside of the lower mold 21.

Accordingly, the laminated iron core body 12, together with the cull plate 24 to which the unwanted resin 30 adheres, can be detached from the lower mold 21 (FIG. 1D).

As described above, before the laminated iron core body 12 is detached from the lower mold 21, the plunger 23 downwardly moved in order to be separated from the resin part 31 is again upwardly moved and thereby, the cracks in the unwanted resin 30 resulting from the vacuum of the inside of the resin pool pot 22 described above can be decreased and further prevented.

Then, the laminated iron core body 12, in which the resin 13 is injected into the resin hole 11 and is cured, is conveyed to the next step with the laminated iron core body 12 placed on the cull plate 24, and a predetermined step is performed and then, the cull plate 24 is detached and the laminated iron core body 12 is used.

Also, in the cull plate 24 detached from the laminated iron core body 12, a bar material etc. are inserted into the gate hole 26 and the unwanted resin 30 is removed and thereafter, the cull plate 24 is repeatedly used for conveyance of a different laminated iron core body 12, and the method for injecting the resin described above is sequentially performed with respect to this laminated iron core body 12.

Next, an apparatus (hereinafter simply also called a resin injecting apparatus) for injecting a resin into a laminated iron core according to a second embodiment of the present invention will be described with reference to FIGS. 7A to 7D and FIGS. 8A and 8B, but the same numerals are assigned to the same members as the apparatus for injecting the resin into the laminated iron core according to the first embodiment described above, and detailed description is omitted.

The apparatus for injecting the resin into the laminated iron core has a mold device 60, and the mold device 60 includes an upper mold, a lower mold 21 and a cull plate 61 (used instead of the cull plate 24 described above).

The cull plate 61 is respectively formed with a runner 25 and a gate hole 26 communicated to this runner 25.

The side of the cull plate 61 opposed to a plunger 23 includes a close contact part 63 with a resin 13, the close contact part 63 including a recess 62 recessed to the side of a laminated iron core body 12 (the side opposite to the side of the plunger 23) beyond a position of a groove bottom 25a of the runner 25 formed in the cull plate 61. Accordingly, a surface area capable of making close contact with the resin 13 can be increased, with the result that properties of adhesion of an unwanted resin 64 (a resin part 65 overlapping with a contact surface 34 of the plunger 23 in plan view) to the cull plate 61 can be improved.

The recess 62 has a circular cross section, and an inside diameter (or an inside width) of the recess 62 is gradually increased in diameter (or increased in width) toward the side of the plunger 23. An inclination angle θ3 of an inner peripheral surface (one example of a peripheral side surface) 66 of this recess 62 is not particularly limited, but is preferably set at values from 3° to 18° (both inclusive) (preferably, a lower limit is 5° and an upper limit is 15°) with respect to the shaft center of the laminated iron core body 12.

Accordingly, both of mold release properties and properties of close contact between the cull plate 61 and the unwanted resin 64 can be more improved.

In addition, properties of adhesion of the resin part 65 to the recess 62 can be more improved by performing the polishing processing described above on a surface (an upper surface) 67 opposed to the plunger 23 in the recess 62.

Also, properties of mold release of the resin part 65 from the recess 62 can be more improved by performing the satin processing described above on the inner peripheral surface 66 of the recess 62.

Also, the recess 62 includes a resin pool pot 22 in plan view (that is, a minimum inside diameter (an inside diameter of an upper end position) of the recess 62 is larger than an inside diameter d of the resin pool pot 22).

Figure 9B:
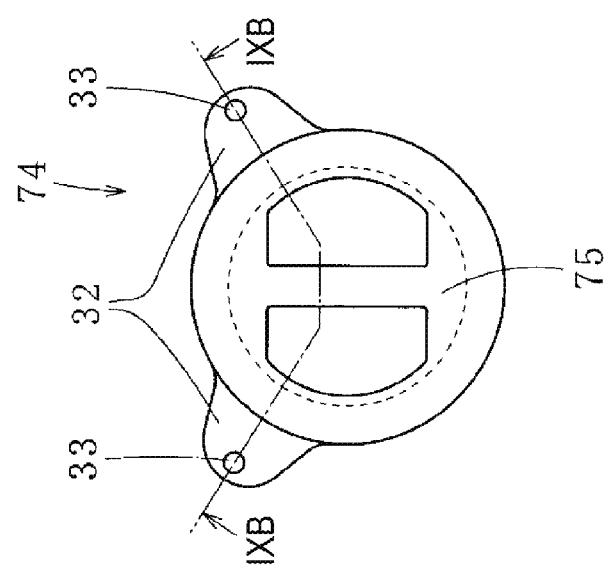
FIG. 9B is a sectional view taken on arrow IXB-IXB of FIG. 9A in a cull plate.

In addition, a shape of the close contact part is not limited to this and, for example, the depth or the inside diameter of the recess can be changed variously, and can also be formed in a shape shown in FIGS. 9A and 9B. Since this configuration described in FIGS. 9A and 9B is substantially similar to that of FIGS. 7A to 7D and FIGS. 8A and 8B, the same numerals are assigned to the same members.

A close contact part 70 shown in FIGS. 9A and 9B includes a recess 71 (substantially similar to the recess 62) recessed to the side of a laminated iron core body 12 (the side opposite to the side of the plunger 23) beyond a position of a groove bottom 25a of a runner 25 formed in a cull plate 73, and the inside of this recess 71 is further provided with two semicircular projections 72 projected to the side of the plunger 23. In addition, the height of the projection 72 is smaller than the depth of the recess 62.

Accordingly, a surface area capable of making close contact with the resin 13 can be further increased, with the result that properties of adhesion of an unwanted resin 74 (a resin part 75 overlapping with a contact surface 34 of the plunger 23 in plan view) to the cull plate 73 can be improved. Also, it becomes easy to dissolve the resin 13, and properties of filling of a resin hole 11 with the liquid resin 13 can be improved.

Subsequently, a method for injecting the resin into the laminated iron core according to the second embodiment of the present invention will be described with reference to FIGS. 7A to 7D and FIGS. 8A and 8B, but is substantially similar to the method for injecting the resin into the laminated iron core according to the first embodiment described above, with the result that detailed description is omitted.

First, the laminated iron core body 12 manufactured by sequentially laminating the plurality of iron core pieces 10 blanked from a strip workpiece using a die unit (not shown) is set in the mold device 60 and is clamped.

Next, with the laminated iron core body 12 clamped, the liquid resin 13 of the inside of the resin pool pot 22 is extruded by upwardly moving the plunger 23, and the resin 13 is injected into the resin hole 11 through the cull plate 61 and is cured (FIG. 7A).

At this time, the upper end of the plunger 23 is projected from an upper surface of the lower mold 21, and is upwardly moved to a position (the inside of the cull plate 61) upper than a lower surface of the cull plate 61.

Accordingly, the thickness of the resin 13 of the inside of the recess 62 can be thinned (the gap between the cull plate 61 and the plunger 23 can be narrowed), with the result that the use amount of the resin 13 can be reduced and properties of filling of the resin hole 11 with the liquid resin 13 can be improved.

As described above, the plunger 23 is separated from the cured resin 13 (the resin part 65) by moving the plunger 23 in a downward direction (a direction away from the laminated iron core body 12) before the laminated iron core body 12 together with the cull plate 61 is detached from the lower mold 21 after the resin 13 injected into the resin hole 11 is cured (FIG. 7B: that is, a step A).

Accordingly, an effect of decreasing and further preventing cracks (fractures) in the unwanted resin 64 becomes more remarkable.

After the plunger 23 is separated from the resin part 65, the plunger 23 is upwardly moved (is moved to the side of the laminated iron core body 12: that is, a step B), and is projected from the inside of the resin pool pot 22 and also, the upper mold, the laminated iron core body 12 and the cull plate 61 are upwardly moved to a specific position and thereby, the cull plate 61 is separated from the lower mold 21 (FIG. 7C). At this time, movements of the upper mold, the laminated iron core body 12 and the plunger 23 synchronize.

Thereafter, the upper mold is detached from the laminated iron core body 12 and also, the plunger 23 is downwardly moved to the inside of the lower mold 21.

Accordingly, the laminated iron core body 12, together with the cull plate 61 to which the unwanted resin 64 adheres, can be detached from the lower mold 21 (FIG. 7D).

From the above, use of the apparatus and the method for injecting the resin into the laminated iron core of the embodiments of the present invention can manufacture the laminated iron core with the unwanted resin adhering to only the cull plate (without adhering to the lower mold) without producing the cracks in the unwanted resin, with the result that workability of work of removing the unwanted resin can be improved and also, the used amount of the resin can be reduced.

In summary, a first aspect of the present invention provides an apparatus for injecting a resin into a laminated iron core, the apparatus including: a mold unit which includes a resin pool part; a receive unit paired with the mold unit and clamping a laminated iron core body from both sides in a lamination direction between the receive unit and the mold unit, wherein the laminated iron core body includes a plurality of laminated iron core pieces and a resin hole pierced in the lamination direction inside the laminated iron core body; a plunger which extrudes a resin of an inside of the resin pool part formed in the mold unit; and a cull plate arranged between the laminated iron core body and the mold unit, and including a runner through which the extruded resin is injected to the resin hole of the laminated iron core body, wherein the cull plate includes a close contact part with the resin on a side opposed to the plunger, the close contact part including a projection projected to a side of the plunger beyond a groove bottom of the runner formed in the cull plate, or a recess recessed to a side of the laminated iron core body beyond the groove bottom of the runner formed in the cull plate.

The apparatus may be configured such that the close contact part includes the projection, and an outside width of the projection is gradually decreased toward the side of the plunger.

The apparatus may be configured such that the close contact part includes the recess, and an inside width of the recess is gradually increased toward the side of the plunger.

The apparatus may be configured such that the close contact part includes the recess, and an inside of the recess further includes a projection projected to the side of the plunger.

The apparatus for injecting the resin into the laminated iron core according to the first aspect of the present invention may be configured such that the close contact part further includes a first widened part having an inside width larger than an inside width of the resin pool part.

The runner may be communicated to the first widened part.

The apparatus for injecting the resin into the laminated iron core according to the first aspect of the present invention may be configured such that the side of the cull plate opposed to the plunger includes a dummy runner communicated to the resin hole.

The apparatus for injecting the resin into the laminated iron core according to the first aspect of the present invention may be configured such that a surface of the close contact part opposed to the plunger has a polish finishing part.

A peripheral side surface of the close contact part may have a satin finishing part.

The apparatus for injecting the resin into the laminated iron core according to the first aspect of the present invention may be configured such that the resin pool part present in a side of the mold unit opposed to the cull plate includes a second widened part having an inside width larger than an outside width of the plunger.

An inside width of the second widened part may be gradually increased toward a side of the cull plate.

A second aspect of the present invention provides a method for injecting a resin into a laminated iron core, the method including: arranging and clamping a laminated iron core body between a receive unit and a mold unit with a cull plate provided between the laminated iron body and the mold unit, wherein the laminated iron core body includes a plurality of laminated iron core pieces and a resin hole pierced in the lamination direction inside the laminated iron core body; with the laminated iron core body being clamped, extruding a resin of an inside of a resin pool part formed in the mold unit using a plunger and injecting the resin into the resin hole through the cull plate, wherein the cull plate includes a close contact part with the resin on a side opposed to the plunger, the close contact part including a projection projected to a side of the plunger beyond a groove bottom of a runner formed in the cull plate, or a recess recessed to a side of the laminated iron core body beyond the groove bottom of the runner formed in the cull plate; after curing the resin in the resin hole, separating unwanted resin from the plunger by moving the plunger by a given distance in a direction away from the laminated iron core body before the cull plate together with the unwanted resin is detached from the mold unit; and after separating the unwanted resin from the plunger, moving the plunger to the side of the laminated iron core body.

The present invention has been described above with reference to the concrete embodiments, but the present invention is not limited to the configurations described in the embodiments described above, and also includes other embodiments and modified examples contemplated within the scope of the matter described in the claims. For example, the case of constructing the apparatus and the method for injecting the resin into the laminated iron core of the present invention by combining a part or all of the respective embodiments and the modified examples described above is also included in the scope of right of the present invention.

The embodiments described above describe the case of injecting the resin into the resin hole from the resin pool part formed in the lower mold (the case of injecting the resin from the downward side of the laminated iron core body), but the resin can also be injected into the resin hole from a resin pool part formed in the upper mold (the resin is injected from the upward side of the laminated iron core body). In this case, the plunger is moved in a direction opposite to that of the embodiments described above. Concretely, before the cull plate is detached from the mold unit (the upper mold) after the resin into the inside of the resin hole is cured, the plunger is upwardly moved and then, the plunger is again downwardly moved.

In addition, the resin may be injected into the resin hole at once for the whole laminated iron core body and also, the resin may be injected into each of the resin holes sequentially while rotating the laminated iron core body at a preset angle.

And, in the case of injecting the resin into the resin hole, by variously changing a position of formation of the runner and the gate hole of the cull plate for communicating the resin pool part to the resin hole, the resin can be injected from one plunger (resin pool part) to a plurality of resin holes, but the resin can also be injected from one plunger to one resin hole. The runner and the gate hole may be formed from a mold unit without using a cull plate.

Also, as long as the area (surface area) of contact with the resin can be increased, the shapes of the close contact part are not limited to the embodiments described above and, for example, the close contact can also be formed stepwise by further forming one or more recesses and/or projections for the projection and also by further forming one or more recesses and/or projections for the recess.

Further, the close contact may be constructed of a plurality of minute projections or recesses, and the shape of each projection or each recess in plan view can be formed in, for example, a circle, an ellipse, a triangle or a quadrilateral (polygon).

Reference signs and numerals corresponding to some elements of the embodiment are listed as below.

10: IRON CORE PIECE
11: RESIN HOLE
12: LAMINATED IRON CORE BODY
13: RESIN
20: MOLD DEVICE
21: LOWER MOLD (MOLD UNIT)
22, 22a: RESIN POOL POT (RESIN POOL PART)
23: PLUNGER
24: CULL PLATE
25: RUNNER
25a: GROOVE BOTTOM
26: GATE HOLE
27: PROJECTION
28: CLOSE CONTACT PART
29: OUTER PERIPHERAL SURFACE (PERIPHERAL SIDE SURFACE)
30: UNWANTED RESIN
31, 32, 32a, 33, 33a: RESIN PART
34: CONTACT SURFACE
35: OPPOSED SURFACE
40: CLOSE CONTACT PART
41: CULL PLATE
42: FIRST WIDENED PART
43: UNWANTED RESIN
44: RESIN PART
45: CLOSE CONTACT PART
46: CULL PLATE
47: DUMMY RUNNER
48: UNWANTED RESIN
49: DUMMY GATE HOLE
50: CLOSE CONTACT PART
51: PROJECTION
52: OPPOSED SURFACE
53: CULL PLATE
54, 54a: LOWER MOLD (MOLD UNIT)
55, 56: SECOND WIDENED PART
57: INNER PERIPHERAL SURFACE
58: UNWANTED RESIN
60: MOLD DEVICE
61: CULL PLATE
62: RECESS
63: CLOSE CONTACT PART
64: UNWANTED RESIN
65: RESIN PART
66: INNER PERIPHERAL SURFACE (PERIPHERAL SIDE SURFACE)
67: OPPOSED SURFACE
70: CLOSE CONTACT PART
71: RECESS
72: AUXILIARY PROJECTION
73: CULL PLATE
74: UNWANTED RESIN
75: RESIN PART
80: CULL PLATE

What is claimed is:

1. An apparatus for injecting a resin into a laminated iron core, the apparatus comprising:
a mold unit which includes a resin pool part;
a receive unit paired with the mold unit and clamping a laminated iron core body from both sides in a lamination direction between the receive unit and the mold unit, wherein the laminated iron core body includes a plurality of laminated iron core pieces and a resin hole pierced in the lamination direction inside the laminated iron core body;
a plunger which extrudes a resin of an inside of the resin pool part formed in the mold unit; and
a cull plate arranged between the laminated iron core body and the mold unit, and including a runner through which the extruded resin is injected to the resin hole of the laminated iron core body,
wherein the cull plate includes a close contact part with the resin on a side opposed to the plunger, the close contact part including a projection projected to a side of the plunger beyond a groove bottom of the runner formed in the cull plate, or a recess recessed to a side of the laminated iron core body beyond the groove bottom of the runner formed in the cull plate.

2. The apparatus for injecting the resin into the laminated iron core according to claim 1, wherein the close contact part includes the projection, and an outside width of the projection is gradually decreased toward the side of the plunger.

3. The apparatus for injecting the resin into the laminated iron core according to claim 1, wherein the close contact part includes the recess, and an inside width of the recess is gradually increased toward the side of the plunger.

4. The apparatus for injecting the resin into the laminated iron core according to claim 1, wherein the close contact part includes the recess, and an inside of the recess further includes a projection projected to the side of the plunger.

5. The apparatus for injecting the resin into the laminated iron core according to claim 1, wherein the close contact part further includes a first widened part having an inside width larger than an inside width of the resin pool part.

6. The apparatus for injecting the resin into the laminated iron core according to claim 5, wherein the runner is communicated to the first widened part.

7. The apparatus for injecting the resin into the laminated iron core according to claim 1, wherein the side of the cull plate opposed to the plunger includes a dummy runner communicated to the resin hole.

8. The apparatus for injecting the resin into the laminated iron core according to claim 1, wherein a surface of the close contact part opposed to the plunger has a polish finishing part.

9. The apparatus for injecting the resin into the laminated iron core according to claim 8, wherein a peripheral side surface of the close contact part has a satin finishing part.

10. The apparatus for injecting the resin into the laminated iron core according to claim 1, wherein the resin pool part present in a side of the mold unit opposed to the cull plate includes a second widened part having an inside width larger than an outside width of the plunger.

11. The apparatus for injecting the resin into the laminated iron core according to claim 10, wherein an inside width of the second widened part is gradually increased toward a side of the cull plate.

12. A method for injecting a resin into a laminated iron core, the method comprising:
arranging and clamping a laminated iron core body between a receive unit and a mold unit with a cull plate provided between the laminated iron body and the mold unit, wherein the laminated iron core body includes a plurality of laminated iron core pieces and a resin hole pierced in the lamination direction inside the laminated iron core body;

with the laminated iron core body being clamped, extruding a resin of an inside of a resin pool part formed in the mold unit using a plunger and injecting the resin into the resin hole through the cull plate, wherein the cull plate includes a close contact part with the resin on a side opposed to the plunger, the close contact part including a projection projected to a side of the plunger beyond a groove bottom of a runner formed in the cull plate, or a recess recessed to a side of the laminated iron core body beyond the groove bottom of the runner formed in the cull plate;

after curing the resin in the resin hole, separating unwanted resin from the plunger by moving the plunger by a given distance in a direction away from the laminated iron core body before the cull plate together with the unwanted resin is detached from the mold unit; and after separating the unwanted resin from the plunger, moving the plunger to the side of the laminated iron core body.

\* \* \* \* \*